Sept. 11, 1962  H. MÖLLER  3,052,915
CONTINUOUSLY OPERATING SAUSAGE FILLING MACHINE
Filed Aug. 16, 1960
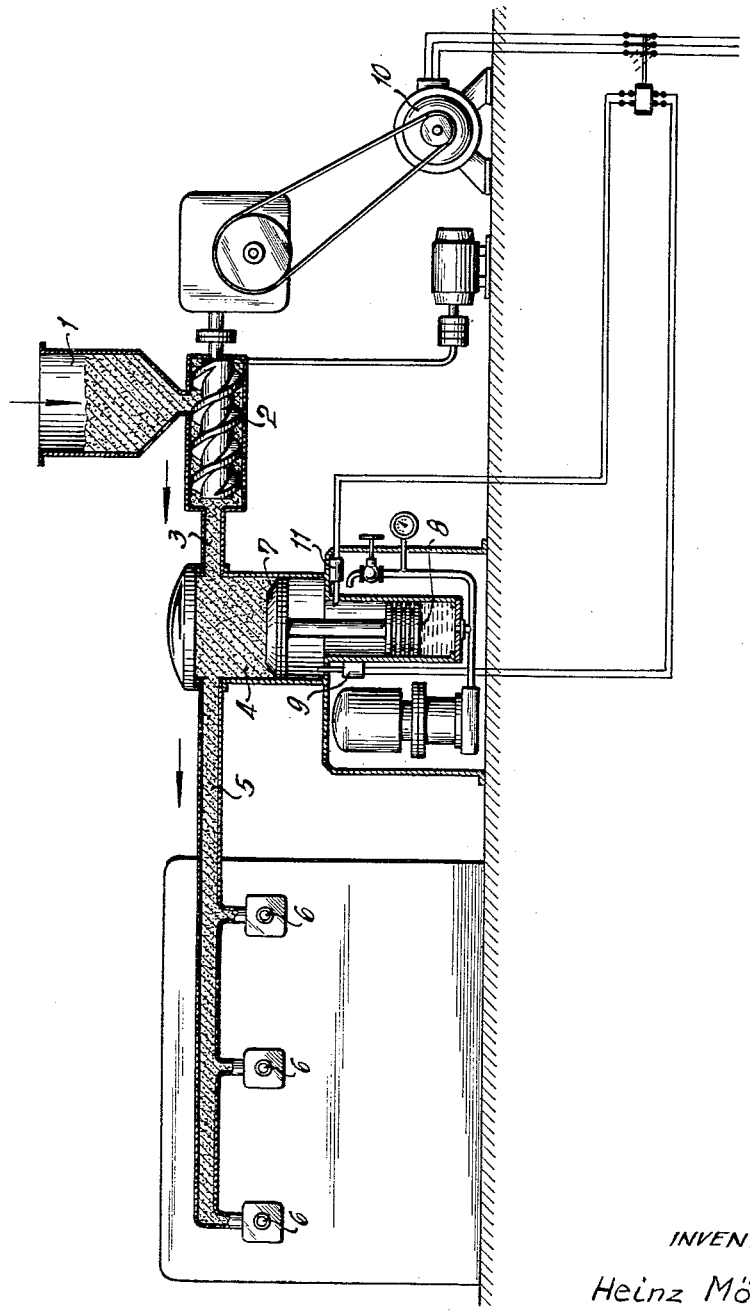
INVENTOR
Heinz Möller
BY
Richards & Geier
ATTORNEYS

United States Patent Office 3,052,915
Patented Sept. 11, 1962

3,052,915
CONTINUOUSLY OPERATING SAUSAGE FILLING MACHINE
Heinz Möller, Am Konigstien 5, Remscheid, Germany
Filed Aug. 16, 1960, Ser. No. 50,022
Claims priority, application Germany Sept. 18, 1959
2 Claims. (Cl. 17—40)

This invention pertains to a continuously operating sausage filling machine.

Continuously operating sausage filling machines now in use are provided with a plurality of filling stations and in the course of their operation, it happens that the work of one or several of these filling stations must be temporarily discontinued; this happens, for example, when a new supply of sausage skins must be introduced into the station or stations. At that time, an accumulation of the filling takes place in the machine. In prior art devices, this accumulation of the filling is removed by means of a valve which is opened by the pressure of the filling so that it can flow back into the supply container. A device of this type was found to be unsatisfactory, since the quality of the filling is damaged due to the extension of the path which it must travel before it finally reaches a filling station.

An object of the present invention is to eliminate these defects of prior art machines and to provide a continuously operating sausage filling machine having means which will not damage the sausage filling or extend its path of movement and which at the same time, will provide effective compensation for the accumulation of the filling taken place when one or more filling stations are placed out of operation.

Other objects of the present invention will become apparent in the course of the following specification.

In accomplishing the objects of the present invention, it was found desirable to gather the filling in the case of the stoppage of one or more stations in an accumulating device and to press the filling out of the accumulating device into the regular flow of the filling whenever this is required. In accordance with the present invention, the accumulating device is constructed as a container provided with a hydraulic driven piston which recedes when certain high pressure is exerted upon it and which moves up again when such pressure is diminished so as to press the filling into the flow path extending to the filling stations. The accumulating device is connected with switches which operate automatically to cut off the supply of the filling by a pump when the space in the accumulating device is completely filled, and which switch the pump on again when the accumulating device is emptied of the filling.

The invention will appear more clearly from the following detailed descriptions when taken in connection with the accompanying drawing showing, by way of example, a preferred embodiment of the inventive idea.

The sole FIGURE of the drawing shows diagrammatically in section and partly in side view, the portion of the sausage filling machine which embodies the principles of the present invention.

The sausage filling machine is provided with the usual comminuting and mixing devices which prepare the sausage filling and which are not shown in the drawing. The filling thus prepared is introduced into a container 1 and then reaches a helical pump 2 which is located below the container 1 and is in communication therewith. Stations 6 wherein the filling is divided and introduced into the sausage skins are indicated diagrammatically in the drawing. The connection between the filling stations 6 and the helical pump 2 is provided by the conduits 3 and 5 and also by the chamber of the accumulating device 4 which is located between the conduits 3 and 5 and is in communication therewith.

The accumulating device 4 has the shape of a hollow cylindrical container, the bottom of which is formed by a piston 7. The piston 7 is firmly connected with a second smaller piston 8 operated by hydraulic means which are indicated diagrammatically in the drawing.

The upward pressure of the hydraulic means upon the piston 8 and the downward pressure of the filling which is pushed out by the pump 2, are so regulated that the piston 7 yields and is moved downwardly when pressure in the conduits 3 and 5 is increased due to the fact that one or more filling stations 6 is placed out of operation.

It is thus apparent that when all the stations 6 are in operation, the filling from the container 1 will be transported by the helical pump 2 and will be pushed through the conduit 3, the upper portion of the accumulating device 4 and the conduit 5 to the stations 6.

On the other hand, when one or more of the stations 6 is placed out of operation, the filling will accumulate in the conduits 3 and 5 and will exert an increasing pressure upon the piston 7 thereby causing the piston 7 to move downwardly. Thus, additional space will be provided in the accumulating device 4 for receiving the filling.

As soon as the filling stations 6 are placed again in operation, the pressure upon the piston 7 will diminish and additional supplies of the filling will be able to flow to the stations 6 out of the accumulating device 4.

Furthermore, in accordance with the present invention, means are provided to switch off the supply of the filling automatically when the accumulating device 4 is filled to its capacity. These means include a switch 9 which is so located that it will be engaged and actuated by the piston 7 in its lowermost position. The switch 9 is connected by conduits which are diagrammatically indicated in the drawing with a motor 10 which drives the pump 2. As soon as the switch 9 is engaged by the piston 7, it will operate to switch off the motor 10. Then the pump 2 will be also stopped and the flow of the filling through the conduits 3 and 5 will come to a standstill.

When the stations 6 are placed again in operation, they will absorb some of the filling, since the supplying means (not shown) at the station 6 will continue to operate. Due to this consumption of the filling, the pressure upon piston 7 will decrease and the hydraulic means operating upon the piston 8 will gradually move upwardly the pistons 7 and 8. When as the result of the upward movement of the piston 7, the accumulating device 4 is completely emptied, the piston 8 will reach its uppermost position and in that position, it will engage another switch 11 which is also connected with the driving motor 10. The switch 11 then operates to switch on the motor 10 so that the helical pump 2 will be able to resume its operations.

It is apparent that the illustrated construction has been described solely by way of illustration and not by way of limitation and that it is subjejct to many variations and modifications within the scope of the present invention. All such variations and modifications are to be included within the scope of the present invention.

What is claimed is:

1. In a continuously operating sausage filling machine, in combination with a plurality of filling stations, a filling container, and means constituting a passage for the filling from said container to said stations, said means comprising a filling-transmitting pump communicating with said container, a filling chamber located in said passage, a conduit connecting said chamber with said pump, and another conduit connecting said chamber with said filling stations; a piston movably mounted in said chamber, and hydraulic means actuating said piston, said piston being adapted to recede and expose a larger portion of said chamber to the filling against the action of said hydraulic means when the filling in said conduits exerts a larger pressure, said hydraulic means causing said piston to return the filling from said chamber into said conduits upon diminution of said pressure.

2. In a continuously operating sausage filling machine, in combination with a plurality of filling stations, a filling container, and means constituting a passage for the filling from said container to said stations, said means comprising a filling-transmitting pump communicating with said container, filling chamber located in said passage, a conduit connecting said chamber with said pump, and another conduit connecting said chamber with said filling stations; a piston movably mounted in said chamber, another piston connected with the first-mentioned piston and movable therewith, hydraulic means engaging the second-mentioned piston, said piston being movable by said hydraulic means against the pressure of the filling from a lowermost position in which the first-mentioned piston provides access to the entire chamber for said filling to an uppermost position, a switch carried by said device and operatively connected with said motor, said switch being engaged and operated by the first-mentioned piston in said lowermost position to switch off said motor, and another switch carried by said device and operatively connected with said motor, said other switch being engaged and operated by the second-mentioned piston in said uppermost position to again start said motor.

References Cited in the file of this patent

UNITED STATES PATENTS

| | | |
|---|---|---|
| 1,804,449 | Woodruff | May 12, 1931 |
| 2,301,136 | Moreland et al. | Nov. 3, 1942 |
| 2,634,885 | North | Apr. 14, 1953 |
| 2,678,752 | West | May 18, 1954 |

FOREIGN PATENTS

| | | |
|---|---|---|
| 606,685 | Germany | Dec. 14, 1934 |
| 1,025,750 | Germany | Mar. 6, 1958 |